United States Patent [19]

Zanchi et al.

[11] 4,302,808
[45] Nov. 24, 1981

[54] MULTILEVEL INTERRUPT HANDLING APPARATUS

[75] Inventors: Vittorio Zanchi, Milan; Tiziano Maccianti, Pregnana Milanese, both of Italy

[73] Assignee: Honeywell Information Systems Italia, Milan, Italy

[21] Appl. No.: 90,616

[22] Filed: Nov. 2, 1979

[30] Foreign Application Priority Data

Nov. 6, 1978 [IT] Italy ............................ 29453 A/78

[51] Int. Cl.³ .............................................. G06F 3/04
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,445,822 | 5/1969 | Driscoll | 364/200 |
| 3,473,155 | 10/1969 | Couleur et al. | 364/200 |
| 3,534,339 | 10/1970 | Rosenblatt | 364/200 |
| 3,611,305 | 10/1971 | Greenspan et al. | 364/200 |
| 3,611,307 | 10/1971 | Podvin et al. | 364/200 |
| 3,710,324 | 1/1973 | Cohen et al. | 364/200 |
| 3,800,287 | 3/1974 | Albright | 364/200 |
| 3,832,692 | 8/1974 | Henzel et al. | 364/200 |
| 3,866,181 | 2/1975 | Gayman et al. | 364/200 |
| 3,925,766 | 12/1975 | Bardotti et al. | 364/200 |
| 3,967,246 | 6/1976 | House | 364/200 |
| 3,983,540 | 9/1976 | Keller et al. | 364/200 |
| 4,096,569 | 6/1978 | Barlow | 364/200 |
| 4,096,571 | 6/1978 | Vander Mey | 364/200 |
| 4,096,572 | 6/1978 | Namimoto | 364/200 |
| 4,106,104 | 8/1978 | Nitta et al. | 364/900 |
| 4,148,011 | 4/1979 | McLagan et al. | 364/900 |

Primary Examiner—Gareth D. Shaw
Assistant Examiner—Thomas M. Heckler
Attorney, Agent, or Firm—Milton M. Field

[57] ABSTRACT

An interrupt handling apparatus for a data processing system comprising a plurality of processing units and a working memory to which the units may access through a common bus by means of multilevel priority or access requests.

Access requests are forwarded by each unit to a bus access controller preferably made part of the working memory through a single lead for each unit, irrespective of the access request priority level; and if the priority level of an access request is high, a high priority level access request signal is distributed by the high priority level interrupting unit to the other system units, which mask their possible access request of a lower priority level in response to such signal.

The bus access controller grants access to a unit at a time on a priority basis determined by a priority network in the controller totally insensitive to any priority level difference of the access requests.

3 Claims, 6 Drawing Figures

MULTILEVEL INTERRUPT HANDLING APPARATUS

BACKGROUND OF THE INVENTION

The present invention relates to data processing systems and more particularly to the transfer of information over a common input/output bus.

In systems having a plurality of devices coupled over a common channel or BUS some means must be provided by which an orderly transfer of information over such channel may be provided and the conflicts and the interferences rising in the use of such bus may be solved.

In general, the previously adopted solutions provide for a privileged device or MASTER, which may be a central unit, a control unit with such specific function, or the system working memory, having the task of controlling the channel use so as to solve the conflicts. To this end, a pre-established priority is assigned to each unit which asks to access the BUS. The MASTER detects periodically if BUS access requests are present and, in case of two or more contemporaneous requests, it assigns the BUS to the requesting unit having greater priority. Such solutions have the disadvantage of assigning the priorities in a rigid way and the risk exists that the unit with greater priority monopolizes the access to the BUS at disadvantage of the other units.

According to some prior art embodiments, such risk is avoided by assigning to the units a variable priority which is changed in accordance with the circumstances: in such case the MASTER assigns the relative priority among the various units according to the different needs. However, the MASTER is required to supervise the different operations made by the several units in order to know the real needs of such units. Therefore, such solutions are not suitable to solve the conflicts in a system where various units are coupled through a BUS and a plurality of intelligent autonomous units act together, as for instance in the Multiprocessor systems. In addition, in such a case, the priority network, which must handle the conflicts, must be particularly complex.

According to other prior art embodiments, each unit can send, in accordance with its needs, access requests at different priority levels using several signals on a plurality of leads. This requires the use of a great number of leads, as well as the use of a very complex priority network in the MASTER: practically, it is as if the MASTER had to handle as much apparent units as the real number of such units multiplied by the different types of requests which can be sent by each unit. Then, the handling problem of the access requests to BUS is further complicated by the intervention of other elements, such as: the synchronous and the asynchronous nature of the access requests and the synchronous or asynchronous operation of the MASTER.

SUMMARY OF THE INVENTION

It is therefore one of the purposes of the present invention to supply an apparatus for the handling of data transfer requests in data processing systems formed by a plurality of autonomous units which want, at the same time, the access to a working memory or, in general, to a MASTER through a common BUS to which all units are connected, said apparatus being simple and economical.

Another purpose of the present invention is to provide an interrupt handling apparatus which makes use of a reduced number of leads and, at the same time, which enables the several units to send access requests at different priority levels thus avoiding the risks of BUS monopolization by the unit with the highest priority.

Another purpose of the present invention is to supply an interrupt handling apparatus where the several units (MASTER and working memory included) exchange information in an asynchronous way.

These and other invention purposes are achieved by the apparatus according to the invention which can be said to be characterised in that it comprises: a simple priority network for fixed priority assignment to several requesting units (such a simplified priority network is part of the working memory or of the MASTER); means suitable to produce BUS access requests at different priority or urgency levels in each unit; and a priority network distributed in each unit which enables the different units to mask their possible access requests with lower priority or urgency level, if at least an access request with higher priority level is present. In other words, the MASTER and its coupled priority network receive only a level of access request each time and only a type of access request from each unit. This makes it possible to greatly simplify the priority network coupled to the MASTER and to reduce the number of leads used for the access request transfer, with the only restriction that the respective priority assigned to the several units must be the same for the different levels.

BRIEF DESCRIPTION OF THE DRAWINGS

These and other features of the invention will appear more clearly from the following description of a preferred embodiment of the invention and by the enclosed drawings in which.

DETAILED DESCRIPTION OF THE PREFERRED EMBODIMENT

Figure 1:
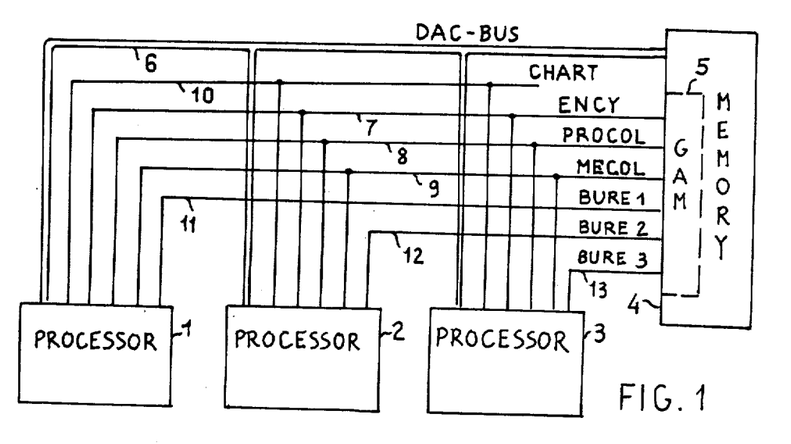
FIG. 1 shows in block diagram the structure of a data processing system including the device of the invention.

FIG. 1 shows in block diagram the structure of the system and of the BUS interconnecting several units. For instance, the system consists of three units or processors 1, 2, and 3 (generally N processors) and a working memory 4 to which a memory access controller GAM 5 is coupled. The units 1, 2, and 3 and GAM 5 are interconnected by means of a single system BUS comprising a suitable number of leads.

The system BUS comprises:

(1) A lead group 6 for the transfer of data, commands, addresses and possibly check bits, such group totally comprising, for instance, 72 leads (4 data bytes, 2 address bytes, 1 command byte and 1 check bit for each byte) This lead group 6, named DAC-BUS, is bidirectional: each unit such as 1, 2, 3, and 4, is coupled to DAC-BUS by means of interface circuits which may both receive and transmit signals. In rest conditions, the transmitting circuits present a virtually infinite output impedance so that the DAC-BUS leads are virtually disconnected from the several units. In work condition, that is when the transmitting circuits of only one unit are active, the transmitting circuits may apply to the leads one of two electric levels corresponding to two logic levels 0 or 1. Later on, unless it is differently specified, the convention will be used for which the logic level 1 corresponds to an electric high level and the logic level 0 to an electric low or zero level. Such logic levels can be detected by all receiving units. Transmitter logic circuits of such type are know as TRISTATE-DRIVERS and are available on the market so that any further information is not essential for understanding the present invention.

(2) A group of leads 7,8, and 9 for the transfer of dialogue controlling signals, such signals being respectively named ENCY, PROCOL, and MECOL. These leads couple the several units 1, 2, 3, and 4 with a connection of the type known as an "open collector": as it will be seen later on, this type of connection requires that the connecting lead be connected to a voltage source through a resistor. In each unit the line is connected to a receiver with relatively high impedance; in at least one unit such line is connected to an open collector transmitter, which may connect said line to ground or virtually disconnect it so as to apply to such line an electric and logic level 0 or 1 respectively. Clearly it suffices that only one of the several transmitters connects the line to ground to obtain an electric logic level 0 on all the line and to have it detected by the different receivers.

(3) A lead 10 for the transfer of a signal CHART; such lead, when at electric logic level 0, indicates that one unit wishes to access the BUS with a high priority level request. This lead interconnects the several units 1, 2, and 3 (but not necessarily GAM 5 too) with an open collector connection.

(4) A group of leads 11, 12, and 13 with individually couple each unit 1, 2, and 3 with GAM 5, by means of an open collector coupling; such leads are used to send to GAM 5 a BUS access request signal respectively named BURE 1, BURE 2, and BURE 3 and to receive from GAM 5 its assent.

Figure 2:
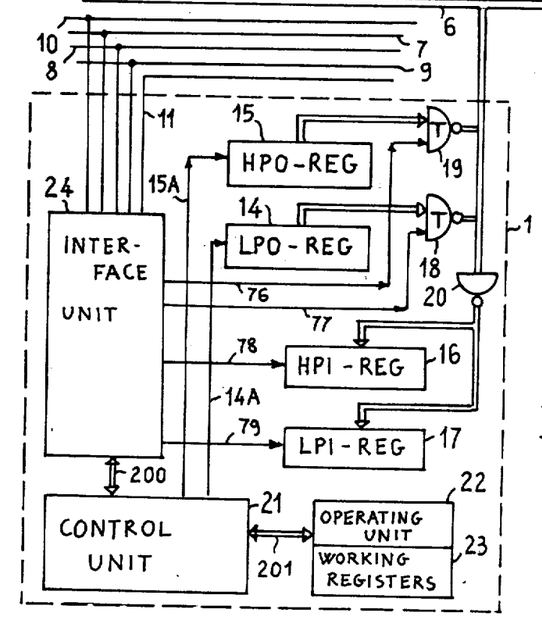
FIG. 2 shows in block diagram, with more details, the structure of the units or processors forming the system of FIG. 1.

FIG. 2 shows in block diagram the structure of a processor such as unit 1, 2 or 3 in FIG. 1. The unit comprises a set of interface registers for storing the received information or the information to be transmitted on BUS, particularly on DAC-BUS 6. As it is purported that the units can enter into BUS with two priority levels, it is convenient, even if generally not essential, that such registers are specifically dedicated to a priority level. Therefore, FIG. 2 shows a register 14 (LPO-REG) used as an output data register for low priority access requests, a register 15 (HPO-REG) for high priority data output, a register 16 (HPI-REG) for high priority data reception and a register 17 (LPI-REG) for low priority data reception. The outputs of registers 14 and 15 are respectively coupled to the inputs of two TRISTATE transmitter sets 18, 19 whose outputs are coupled to DAC-BUS. The inputs of registers 16 and 17 are coupled to the DAC-BUS through a set of receivers 20.

The processor comprises further a control unit 21, an operating unit 22, a working register set 23, and an interface dialogue unit 24. The control unit 21 sends through leads 14A and 15A some control signals to the registers and respectively to registers 14 and 15 to enable them to be loaded and sends suitable commands to the operating unit, to the working registers and to the interface dialogue unit 24 receiving in turn suitable signals from them. The communications paths are shown as 200 and 201. The interface registers communicate through suitable paths, not shown, with the working registers and the operating unit. On its part, the dialogue unit 24 is connected to the system BUS leads already referenced in FIG. 1 with numerals 10, 7, 8, 9, 11 (or 12 or 13). In addition, the dialogue unit enables the groups of transmitters 19 and 18 through signals on leads 76 and 77 and the loading of registers 16 and 17, through a signal on leads 78 and 79.

As a detailed description of the structure of a processor such as the one in FIG. 2 is not essential for understanding the invention, and as such structure can be made in several ways, even very different from each other, such description is omitted. A more detailed description of the embodiment can be found, for instance in U.S. Pat. No. 3,710,324.

On the contrary, for the purposes of the present invention only the architecture of dialogue and priority unit 24, contained in each processor, as well as of the working memory 4 with reference to GAM 5, will be considered in detail. Before going on we will briefly describe the operation of J-K flip-flops because these will be largely used later.

Figure 3:
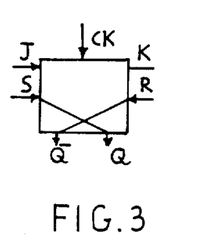
FIG. 3 shows the conventional diagram used in the following figures to show JK flip-flops.

FIG. 3 shows the conventional representation generally used for such a flip-flop which has been available in the market for a long time as an integrated circuit. The J-K flip-flop is a bistable circuit provided with a timing clock input CK, with two direct or set-reset asynchronous inputs S and R with two synchronous or clock conditioned inputs J and K and with two outputs Q and $\bar{Q}$. A signal applied to S or R inputs activates the flip-flop putting it permanently in one of two possible electrical states, while the signals at the J and K inputs activate the flip-flop only when the trailing edge of a positive electrical/logic pulse is applied to CK input. The following table summarizes the J-K flip-flop operation.

| INPUTS | | | | | OUTPUTS | |
|---|---|---|---|---|---|---|
| S | R | CK | J | K | Q | $\bar{Q}$ |
| L | H | X | X | X | H | L |
| H | L | X | X | X | L | H |
| L | L | X | X | X | H | H |
| H | H | L | L | L | $Q_o$ | $\bar{Q}_o$ |
| H | H | L | H | L | H | L |
| H | H | L | L | H | L | H |
| H | H | L | H | H | commutates | |
| H | H | H | X | X | $Q_o$ | $\bar{Q}_o$ |

In the above table L stands for a logic/electric level 0 present at the corresponding output-input;

H for a logic electric level 1;

X for an indifference condition;

$Q_o$ and $\bar{Q}_o$ stand for the state of the Q and $\bar{Q}$ outputs before the signals are applied.

For instance, it can be seen that both S and R inputs must be at logic level 1 to have the flip-flop activated by a clock pulse (CK=L). Later on, for the sake of clarity, the J-K flip-flops will be shown in the several figures as in FIG. 3 without reference letters.

Always for sake of clearness, the possible leaving out of any indication on some inputs, particularly J or K, will designate that an appropriate electrical signal "1"

or "0", suitable to obtain the desired behaviour, is permanently applied to such inputs.

Figure 4:
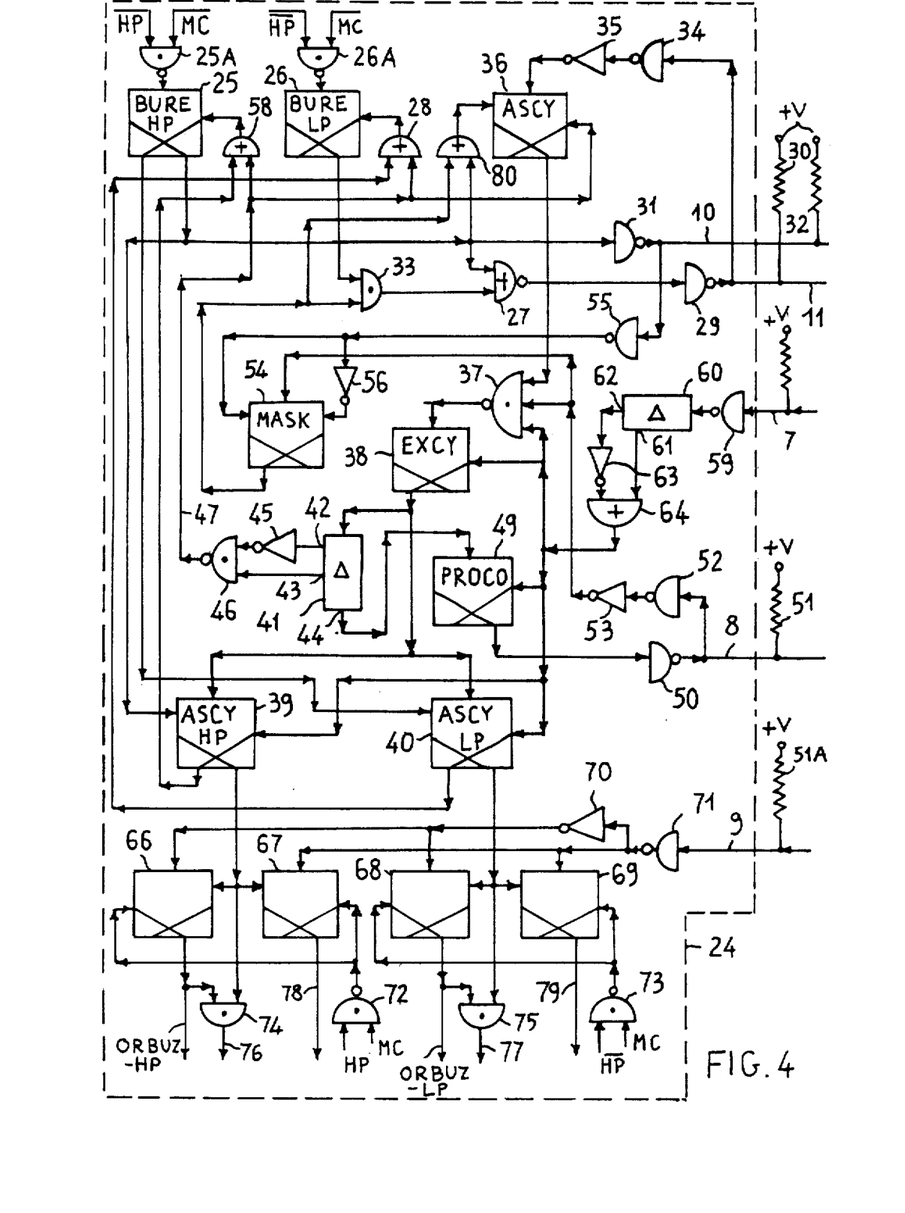
FIG. 4 shows the circuits of the interface dialogue unit included in each unit or processor shown in FIG. 2.

FIG. 4 shows in detail a preferred embodiment of dialogue and priority assignment unit 24 contained in each processor 1, 2 or 3 of FIG. 1 and particularly referring to processor 1. The unit 24 comprises two J-K flip-flops 25 and 26 (BURE-HP and BURE-LP) which receive at the clock input a microcommand MC through two NAND gates 25A and 26A enabled by a signal state HP and $\overline{HP}$ respectively. MC and HP and $\overline{HP}$ come from control unit 21 (FIG. 2). The inverted output $\overline{Q}$ of flip-flop 25 is connected to the J input of a J-K flip-flop 40. The direct output of flip-flop 25 is connected to a first input of a two input NOR gate 27, to a J input of a J-K flip-flop 39, to a first input of a two inputs OR gate 80 and to the input of an open collector inverter/driver 31. The output of inverter/driver 31 is connected to the system BUS lead 10; such lead is kept at logic level 1 by a resistor 32, connected to a +V voltage source, if all driver circuits 31 connected to such lead are opened, say driven with an input signal at logical level 0. It is therefore clear that, when flip-flop 25 is set, lead 10 falls to logic level 0 while it is normally at logic level 1.

The output of NOR gate 27 is connected to an open collector inverter/driver circuit 29 whose output is connected to the system BUS lead 11. As already said, lead 11 is connected to a +V voltage source through a resistor 30, and it is coupled with GAM 5 at the other end. The direct output of flip-flop 26 is connected to a first input of an AND gate 33 whose output is connected to the second input of NOR gate 27. The second input of AND gate 33 is connected to the Q output of a flip-flop 54 (MASK) normally reset.

Flip-flops 25 and 26 are normally reset: it is therefore clear that the respective direct outputs are at logic level 0 and that the output of NOR 27 is at logic level 1, thus lead 11 (BURE 1) is normally at logic level 0. When processor 1 requests access to the BUS, its control unit produces, in an asynchronous way relative to the system operation (though inside the processor the event may occur at a predetermined instant of its machine cycle), a command pulse MC, accompanied by a signal state HP or $\overline{HP}$ according to whether the requested access has high or low priority. Thus one of the two flip-flops 25 or 26 is set. Since one of the two flip-flops 25 or 26 is set, lead 11 rises to logic level 1 and signals to GAM 5 that processor 1 wants access to the BUS (signal BURE at 1). Moreover, if flip-flop 25 is set, lead 10 goes to logic/electrical level 0 (signal CHART at 0) and signals to the other processors, such as 2 and 3, that a high priority access request has been presented in consequence of which they must mask their possible pending low priority access request, until the high priority request has been carried out.

Going on with the unit 24 description, it will be noted that lead 11 is coupled through receiver/inverter 34 and NOT circuit 35 to the clock input of a J-K flip-flop 36 (flip-flop ASCY). This is because, in the preferred embodiment, lead 11 is used for a bidirectional exchange of signals to minimize the number of BUS leads as described in Italian Patent Application Ser. No. 23037 A/78 filed on May 5, 1978 by the assignee of the present application. As described in this prior application and reconsidered later on, GAM 5 answers to the requesting processor, when it decides to allow such processor to access the BUS, dropping again BURE signal on lead 11 to logic level 0. This causes flip-flop 36 (ASCY) to be set. The set is conditioned by the presence of a logic level 1 at the J input which is connected to the output of OR 80. It is however clear that the answer to such processor could be sent on a separate lead other than lead 11.

The direct output Q of flip-flop 36 is connected to a first input of a three input NAND gate 37 whose output is connected to the clock input of a J-K flip-flop 38 (flip-flop EXCY). Enabling signals which will be considered later on are applied at the second and third input of NAND gate 37. They enable the signal transfer from output Q of flip-flop 36 to the clock input of flip-flop 38 only when the BUS is really free. In fact, in the described embodiment, to maximize the information transfer rate on the BUS, the cycle assignment operations overlap the execution and the finishing of the possible previous cycle. Then, when flip-flop 36 (ASCY) is set, once the execution of the possible previous cycle is completed, flip-flop 38 is set and BUS occupation and information transfer start. The $\overline{Q}$ output of EXCY is connected to the clock input of two J-K flip-flops 39 and 40 (ASCY-HP and ASCY-LP). Said flip-flops 39 and 40 receive at the J input the signal present at direct output Q and at inverted output $\overline{Q}$ of flip-flop 25 (BURE-HP), respectively, indicating or not the high priority state in which the dialogue unit 24 is. Depending on the state of flip-flop 25, one of two flip-flops 39 and 40 is set. The $\overline{Q}$ output of EXCY is further connected to the input of a delay line 41 having output taps 42, 43, and 44. Therefore the signal trailing edge at the $\overline{Q}$ output of EXCY (consequent to the setting of EXCY) propagates along such line. Output 42 is connected to the input of a NOT circuit 45. Output 43 and the NOT circuit 45 output are connected to the inputs of a two input NAND gate 46. When the delay line is inactive (EXCY reset), the outputs 43 and 42 are at logic level 1; and the NOT circuit 45 output is at logic level 0. Thus, the NAND gate 46 output is normally at logic level 1. When a trailing edge propagates along line 41, output 42 drops to a logic level 0 before output 43. Thus, the NOT circuit 45 output rises to logic level 1, while output 43 is still at logic level 1, and a pulse at logic level 0 appears at the NAND gate 46 output.

The NAND gate 46 output is connected to the reset input of flip-flop 36 (ASCY) by means of lead 47 and to the reset input of flip-flop 26 (BURE-LP) and flip-flop 25 (BURE-HP) through an OR gate 28 and an OR gate 58 respectively. A second input of gate 28 is connected to the $\overline{Q}$ output of flip-flop 40 (ASCY-LP), and a second input of gate 58 is connected to the $\overline{Q}$ output of flip-flop 39 (ASCY-HP). Therefore, when flip-flop 40 is reset, a logic level 1 is permanently applied to the reset input of flip-flop 26 which cannot be reset by a signal on lead 47 dropping to logic level 0. Likewise, when flip-flop 39 is reset, a logic level 1 is permanently applied at the reset input of flip-flop 25 which cannot be reset by a signal on lead 47 passing to logic level 0.

The output 44 of delay line 41, is connected to the clock input of flip-flop 49 (PROCO). Therefore, with the set of flip-flop EXCY the following events occur: (a) either flip-flop 39 or 40 is set, depending on the state of flip-flop 25 (BURE-HP); (b) flip-flop 36 (ASCY) is reset; flip-flop 25 is reset if it was previously set and if flip-flop 39 had been set immediately before; otherwise flip-flop 25 stays in reset; flip-flop 26 is reset if flip-flop 40 had been set immediately before; otherwise its state does not change; (c) flip-flop 49 (PROCO) is set. The direct output Q of flip-flop 49 (PROCO) is connected to the input of an open collector inverter/driver 50 whose output is connected to system BUS lead 8 to apply the PROCOL signal thereto. Lead 8 is connected to a +V voltage source through a resistor 51; therefore it is normally at logic level 1, but it goes to a logic level 0 when flip-flop 49 is set. It is to be noted that if PROCOL was previously at logic level 0, the set of flip-flop 38 (EXCY) and 49 (PROCOL) would have been prevented till PROCOL should have gone to logic level 1. In fact, lead 8 is connected to the input of an inverter/receiver 52 whose output is connected to the input of a NOT circuit 53. The output of NOT circuit 53 is connected to the second input of NAND gate 37, already considered, whose output controls the set of flip-flop 38. Therefore, the set of flip-flop 38 is conditioned (inter alia) by the presence of logic level 1 on lead 8 (PROCOL).

The NOT circuit 53 output is further connected to the clock input of J-K flip-flop 54 (MASK). Such flip-flop receives at its J and K inputs two signals obtained from lead 10 (CHART). In fact, lead 10 is connected to the input of a receiver/inverter 55, whose output is directly connected to the J input of flip-flop 54 and to the K input of the same flip-flop through a NOT circuit 56. The flip-flop MASK is normally reset, but every time the signal PROCOL goes to logic level 0 such flip-flop may go to a state defined by the level present over J and K inputs. Then it will be noted that, if the signal CHART on lead 10 is at logic level 1, that is no high priority BUS access request is present in the system, the J input is at logic level 0 and the K input at logic level 1. The flip-flop MASK stays then in reset. Whereas, if the signal CHART is at logic level 0, the flip-flop MASK is set. The MASK inverted output $\bar{Q}$ is connected, as before said, to the second input of AND gate 33 as well as to the second input of OR gate 80. Therefore, when MASK is set, AND gate 33 is inhibited and any BUS access request coming from flip-flop 26 (BURE-LP) is inhibited or masked. Likewise, if flip-flop 25 (BURE-HP) is reset and MASK is set, the possible clock pulses applied to the clock input of flip-flop 36 (ASCY) leave such flip-flop in reset.

It is to be noted that the logic level 0 on lead 10 may be imposed by any one of the several system processors, and that such level is detected at the same time by all system processors, which all place their corresponding flip-flop MASK in set. Therefore, if low priority access requests were present on system leads such as 11, 12, and 13, these access requests are masked or inhibited untill flip-flop MASK is reset in each processor. On the other hand, the dropping to 0 of the logic level present on leads 11, 12, or 13 is not interpreted within each processor as a BUS assignment, because the state of flip-flop 25 (BURE-HP) and of flip-flop 54 (MASK) inhibit the set of flip-flop 36 (ASCY). It is to be noted that in this masking process, GAM 5 and the relative priority assignment network do not intervene at all and ignore completely the difference between high and low priority level. It is to be further noted that, if the low priority BUS access requests are masked, the possible high priority access requests are not masked. Therefore, more high priority requests may be present at the same time on BUS leads as 11, 12, and 13. Then, it can be concluded that leads 11, 12, and 13 are used for transmitting access requests with two different priority levels and that such two levels are mutually exclusive. In fact, high priority access requests cause the masking of any possible low priority request, while the presence of a low priority access request presupposes the absence of high priority access requests.

In the embodiment here described, there is only a predetermined time interval in which requests with two different priority levels may be present at the same time; such time interval is the one elapsing between the signal CHART generation (totally asynchronous) at level 0 on lead 10 and the dropping of signal PROCOL to logic level 0 on lead 8 with the consequent set of flip-flop MASK. Later on the reasons why the set of flip-flop MASK is deferred will be explained.

In order to conclude the description of the priority selection and dialogue unit 24, the reset circuits used for resetting flip-flops 54 (MASK), 38 (EXCY), 49 (PROCOL), 39 (ASCY-HP), and 40 (ASCY-LP) will be described. Lead 7 ends in each processor with a receiver/inverter 59. Lead 7 is normally held by GAM 5 at logic level 1. This level drops to 0 near the end of a BUS occupation cycle and rises again to 1 at the cycle end. The output of receiver/inverter 59 is connected to the input of a delay line 60 having output taps 61 and 62. Intermediate tap 61 is connected to a first input of a two input OR gate 64. Tap 62 is connected to the input of a NOT circuit 63, whose output is connected to the second input of OR gate 64. The output of OR gate 64 is connected to the reset input of flip-flops 38, 49, 39, and 40. When delay line 60 is at rest (ENCY at logic level 1) its outputs are at logic level 0 and the output of OR gate 64 is at logic level 1. When ENCY falls to logic level 0, the rising edge at the receiver 59 output propagates from the input to the outputs of line 60 bringing output 61 to logic level 1 before output 62 goes to 0. The output of OR gate 64 remains at 0. On the contrary, when ENCY rises again to logic level 1, it is easy to see that a short pulse at logic level 0 appears at the OR gate 64 ouput. Such pulse is suitably delayed relative to the ENCY leading edge and resets those of flip-flops 38, 49, 39, and 40 which were set. It is clear that only one processor at a time will have flip-flops such as 38 and 39 and one of flip-flops 39 and 40 set, but the ENCY command is clearly forwarded to all the processors.

The above description of the dialogue unit, even if this is not necessary for understanding the present invention, is completed with reference to flip-flops 39 and 40 and to the control function that the dialogue unit performs on the interface registers. It has been already said that $\bar{Q}$ output of flip-flops 39 and 40 is connected to an input of OR gate 58 and OR gate 28, respectively, for masking the reset of flip-flops 25 and 26 respectively. Direct output Q of flip-flop 39 is connected to the K input of a flip-flop 66, to the J input of a flip-flop 67 and to a first input of an AND gate 74. Direct output Q of flip-flop 40 is connected to the K input of a flip-flop 68, to the J input of a flip-flop 69 and to a first input of an AND gate 75. Flip-flops 66, 67, 68, and 69 indicate with their state the state of interface registers 14, 15, 16, and 17. Flip-flops 66 and 68 have their clock input connected to the output of a NOT circuit 70 whose input is connected to the output of a receiver/inverter 71. Flip-flops 67 and 69 have their clock input directly connected to the output of the receiver/inverter 71. The input of receiver 71 is connected to lead 9 on which a MECOL signal, normally at logic level 1, is received from GAM 5. Lead 9 is normally held at logic level 1 by pull up resistor 51A connected to voltage source +V. The set input of flip-flop 66 and reset input of flip-flop 67 are connected to the output of a two input NAND gate 72, which receives on its inputs the HP state signal and the MC microcommand, both coming from control unit 21. The set input of flip-flop 68 and reset input of flip-flop 69 are connected to the output of a two input NAND gate 73. NAND gate 73 receives on its inputs from control unit 21 the HP state signal and the MC microcommand.

When flip-flops 66 and 68 are in set, they indicate to control unit 21, through respective direct outputs ORBUZ-HP and ORBUZ-LP at logic level 1, that output registers 14 and 15 respectively have been loaded and they are busy. In fact, such flip-flops are selectively set by signals HP and MC, or $\overline{HP}$ and MC. Thus, when the processor wants access to the BUS, it provides to load the suitable information into register 14 or 15 (according to whether the request has a low or high priority level) and at the same time it sets one of two flip-flops 25 and 26 (BURE-HP, BURE-LP) and one of two flip-flops 66 and 68 (ORBUZ-HP, ORBUZ-LP). When the BUS is assigned to the requesting processor (flip-flop 39 or 40 set), the information in register 14 or 15 is transferred on DAC-BUS through TRISTATE circuits 18 or 19, respectively, which are enabled by the output of AND gate 75 or 74, respectively, (leads 77 and 76 respectively, FIGS. 2 and 4). AND gate 74 has its two inputs connected to the direct outputs of flip-flops 39 and 66 and enables TRISTATE circuits 19. AND gate 75 has its two inputs connected to the direct outputs of flip-flops 40 and 68 and enables TRISTATE circuits 18. Therefore, information is present on DAC-BUS since signal PROCOL is lowered until when memory 4 answers lowering signal MECOL (thus causing the reset of the one of the two flip-flops 66 and 68 which was set). Likewise, flip-flops 67 and 69, when set, having direct outputs connected to leads 78 and 79 respectively, at logic level 1, provide outputs to load registers 16 and 17 and give indication of that to the control unit. Such flip-flops are selectively set by the rising edge of the MECOL signal, which occurs when Memory 4 has put on DAC-BUS the data which are to be loaded into registers 16 or 17.

Figure 5:
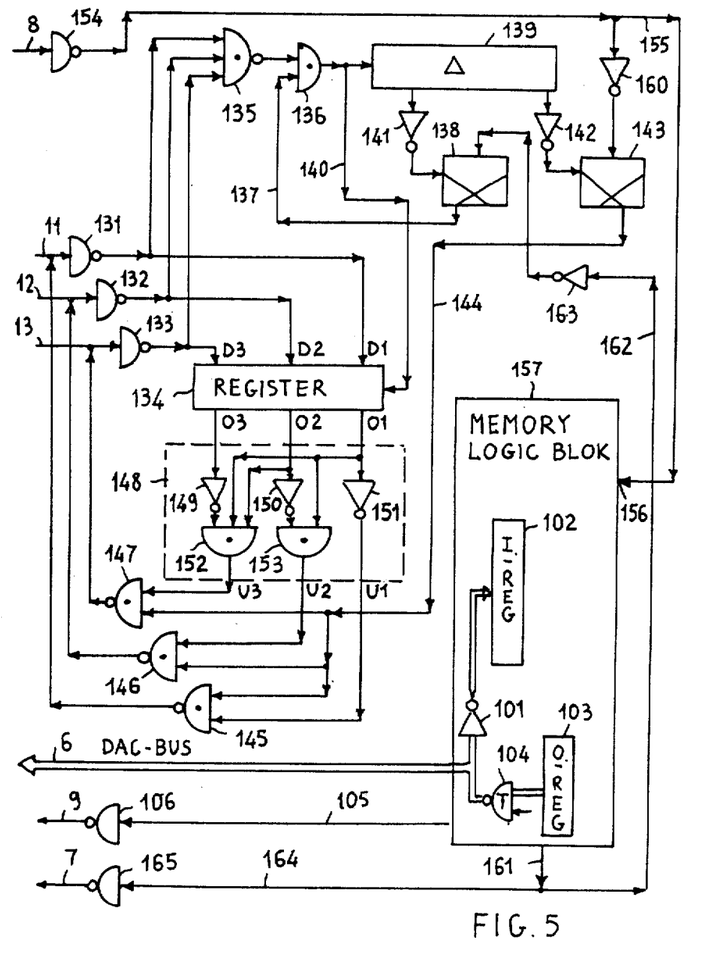
FIG. 5 shows the circuits of a memory and BUS address control unit of the system of FIG. 1.

Having described in detail the dialogue handling and priority level selection unit of the several processors, it is now useful to describe the system memory unit 4 with particular reference to GAM 5 of said unit. This is shown in FIG. 5. Lead 11 is connected to the input of a receiver/inverter circuit 131, lead 12 is connected to the input of a receiver/inverter circuit 132, and similarly lead 13 is connected to the input of a receiver/inverter circuit 133. Outputs of receivers 131, 132, and 133 are coupled both to as many inputs of a NAND gate 135 and to data inputs ($D_1$, $D_2$, $D_3$ respectively) of a register 134. The output of NAND gate 135 is connected to an input of a two input AND gate 136. AND gate 136 receives to a second input, through lead 137, an enabling signal emitted by output $\overline{Q}$ of a J-K flip-flop 138. The output of AND gate 136 is connected to the input of a multitapped delay line 139, as well as to the clock input of register 134, through lead 140. The first output tap of delay line 139 is connected to the input of an inverter NOT circuit 141, whose output is connected to the SET input of J-K flip-flop 138. A second tap of delay line 139 is connected to the input of a NOT circuit 142, whose output is connected to the SET input of a J-K flip-flop 143. Direct output Q of flip-flop 143 is connected through lead 144 to the enabling input of three inverter/driver NAND gates 145, 146, and 147. The outputs of such three inverters/drivers 145, 146, and 147 are connected, respectively, to leads 11, 12, and 13. The signal input of three inverters drivers 145, 146, and 147 is connected respectively to three outputs $U_1$, $U_2$, and $U_3$ of an exclusion logic matrix or priority network 148. The inputs of priority network 148 are coupled to the outputs $O_1$, $O_2$, and $O_3$ of register 134.

In FIG. 5, the priority network comprises three NOT circuits 149, 150, and 151 and two AND gates 152 and 153 with three and two inputs, respectively. Output $O_1$ of register 134 is connected through inverter 151 to output $U_1$ of network 148. In turn, $U_1$ is connected to the signal input of inverter/driver 145. Output $O_1$ is also connected to a first input of the two AND gates 152 and 153. Output $O_2$ of register 134 is connected through inverter 150 to a second input of AND gate 153, whose output $U_2$ is connected to the signal input of inverter/driver 146. Output $O_2$ is also connected to a second input of AND gate 152. Output $O_3$ of register 134 is connected through inverter 149 to the third input of AND gate 152, whose output $U_3$ is connected to the signal input of inverter/driver 147. The function of the exclusion logic matrix or priority network 148 is the one of assigning a relative priority to the memory access requests received by several processors through leads 11, 12, and 13 and of enabling the output from the network of the request with higher priority in case of several simultaneous requests. The priority network shown assigns for instance higher priority to access requests coming from processor 1 through lead 11, intermediate priority to access requests coming from processor 2 through lead 12 and lower priority to requests coming from processor 3 through lead 13. It can be noted that a signal at logic level 0 present on terminal $O_1$ is transferred to output $U_1$, where it appears in inverted form (because of NOT circuit 151), that is as a signal at logic level 1, without any conditioning. On the contrary, a signal at logic level 0 present on terminal $O_2$ is transferred to output $U_2$, only if a signal at logic level 1 is present at the same time to terminal $O_1$; such signal at logic level 1 indicates that an access request with greater priority is not present. Likewise, a signal at logic level 0 present on terminal $O_3$ is transferred to output $U_3$ only if a signal at logic level 1 is present at the same time on both terminals $O_2$ and $O_1$. Terminals $O_1$, $O_2$, and $O_3$ are coupled to the outputs of the register 134 cells, corresponding respectively to inputs $D_1$, $D_2$, and $D_3$ and storing access requests received on leads 11, 12, and 13, respectively, as information at logic level 0. The operation of the memory interface circuits hitherto described is therefore clear: when a processor, for instance processor 2, wants to access the memory it rises to 1 the logic level of signal present on lead 12. Therefore the output of receiver/inverter 132 falls to logic level 0 and the output of NAND gate 135 rises to logic level 1. If AND circuit 136 is enabled because J-K flip-flop 138 is reset (as will be seen later on, this means that memory cycles are not already in progress), logic level 1 is transferred to the output of AND gate 136 and it activates the loading of register 134 through lead 140. Therefore logic level 0 present at the output of NAND gate 132 is loaded into the register together with the logic level present to the output of the other NAND gates 131 and 133. At the same time, logic level 1, present to the output of AND gate 136, is applied to delay line 139 and propagates along such line. When logic level 1 reaches the first tap, the output of NOT circuit 141 falls to logic level 0 and J-K flip-flop 138 is set. Thus, output $\overline{Q}$ of flip-flop 138 falls to logic level 0, and this has the effect of inhibiting AND gate 136. Therefore the possible and following access requests are not transferred to the output of AND gate 136 and then taken into account until flip-flop 138 is reset again. When logic level 1 which propagates along delay line 139 reaches the second tap, flip-flop 143 is set too, through NOT circuit 142. Thus, direct output Q of such flip-flop rises to logic level 1 enabling the AND/DRIVERS circuits 145, 146, and 147. The access request with greater priority among the ones memorized before by register 134 has been in the meantime presented to the output of the priority network 148 as logic level 1. Supposing logic level 1 is present at output $U_2$, the output of the open collector NAND DRIVER 146 falls to logic level 0. Therefore logic level 1 present on lead 12 is forced to 0, as answer and acceptance of the access request. At this point, it is to be borne in mind that flip-flops 138 and 143 are in set, that is they have not been put in initial rest condition. However, when the processor whose request has been accepted receives the acceptance answer, it brings to logic level 0 the signal PROCOL on lead 8, thus indicating that it really accesses the memory.

Logic level 0 present on lead 8 is received by the memory through receiver/inverter 154, whose output rises to logic level 1. The output of receiver/inverter 154 is connected, through lead 155, to an input 156 of a memory command logic block, represented by block 157, and activates it. Details of block 57 are not represented, because they are beyond the purpose of the invention and are not necessary for understanding it. Block 157 also receives through DAC-BUS 6 an information set representative of commands (for instance, write/read, diagnostic test), and of memory addresses, of data to be written in the memory. The DAC-BUS, which is bidirectional, will be used also for sending back to the requesting processor memory state signals and the readout data. DAC-BUS is connected through a receiver/inverter set 101 to inputs of an input register set 102 (I-REG.). Another output register set 103 (O-REG.) in the logic block 157 has its outputs connected to inputs of a tristate NAND/DRIVER set 104, whose outputs are connected to DAC-BUS 6. As soon as logic block 157 receives the signal at logic level 1 on lead 155, it allows the loading of registers 102 and starts the memory operations defined by the content of such registers. At the same time logic block 157 produces on output lead 105 a signal at level 1, indicating the beginning of a memory cycle. Lead 105 is connected to the input of an inverter/driver 106 whose output is connected to lead 9 of the BUS. Therefore signal MECOL on such lead falls to logic level 0 and informs the processor which has received access to the BUS that the memory cycle has started and that the information present on DAC-BUS can be removed. In fact, as already seen with reference to FIG. 4, signal MECOL at 0 causes the reset of flip-flop 66 or 68 and the inhibition of driver set 18 or 19 (FIG. 2). When the requested operation is completed (for instance, in case of data reading), such data are loaded together with other useful information into register set 103 (O-REG.); logic block 157 enables the drivers set 104 to transfer such data and information on DAC-BUS and at the same time it lowers again to 0 the signal present on lead 105. Signal MECOL on BUS lead 9 rises to 1. As already seen, this has the effect of setting flip-flop 67 or 69 (FIG. 4) of the processor to which the cycle has been assigned and of enabling the loading of information present on DAC-BUS into register group 16 or 17 (FIG. 2). The output of receiver/inverter 154 is connected through inverter 160 to the clock input of flip-flop 143. Therefore as soon as PROCOL falls to logic level 0, the output of inverter 160 falls to logic level 0 and flip-flop 143 is reset. Consequently the logic level at the direct output Q of such flip-flop falls to 0 and NAND/drivers 145, 146, 147 are inhibited so that their outputs are disconnected from ground and resume again the normal rest state (it is to be recalled that elements 145, 146, and 147 are of the "open collector" type).

At the end of the memory cycle or preferably some time before (the reasons will be stated later on), the memory command logic block 157 produces on output lead 161 a cycle-end signal at logic level 1. Such signal is applied through lead 162 and inverter 163 to clock input of flip-flop 138 and resets it, thus allowing the transfer of new or still pending access requests through AND circuit 136. Moreover, the signal on lead 161 is sent by means of lead 164 to the input of the inverter/driver 165 whose output is connected to BUS lead 7. Then signal ENCY on lead 7 falls to logic level 0, and it signals to the system processors that the memory cycle in progress is ending. Signal ENCY is suitably held at logic level 0 until the end of the memory cycle, that is it rises to 1 when the memory is ready to begin a new cycle. As before described, the reset of flip-flops 38 and 39 or 40 and 49 of the dialogue unit in the processor to which the cycle had been assigned occurs with ENCY rising again to 1.

It is to be noted that in the previous description of memory circuits 4 and of GAM 5, possible connections with BUS lead 10 or possible effects of the signal CHART present on such lead have not been mentioned. In fact signal CHART is totally invisible to GAM 5 and to memory 4. Therefore, GAM 5 ignores completely whether the requests presented by several processors on leads 11, 12, 13 have a low or high priority level: it recognises only the access requests and assignes to such requests a fixed relative priority, for which lead 11 (and therefore processor 1) has higher priority relative to leads 12 and 13 (and therefore relative to processors 2 and 3) and lead 12 (and therefore processor 2) has higher priority relative to lead 13 (and therefore to processor 3). This is also true for N processors (N>3) with an obvious extension and modification of the priority circuits. Conversely, there are several processors which are just recognising if one of them at least has presented a high level priority access request; and they mask themselves, that is each of them inhibits the transfer on interface leads of its possible low priority access requests until the high priority signal (CHART at logic level 0) is removed. Therefore each processor has in its dialogue unit means comprised by flip-flop 25 for generating a high priority access signal which is suitably transferred on a single communication lead for all processors as well as means substantially comprised by flip-flop 54 (MASK) which, when signal CHART is detected, mask possible low priority access requests which they have already presented or intend to present to GAM 5.

This embodiment allows for considerable structural simplifications and cost reductions and offers a greater versatility compared to the prior art. In fact, the problem of assigning the access to a common BUS as a function of two distinct priority levels might be solved by providing that each processor send on two separate leads access requests with two distinct priority levels. This requires the doubling of leads used for sending access requests and involves therefore a not indifferent tradeoff as to cost of cables, connectors, driving and receiving circuits. In addition, the priority network in GAM 5 should be accordingly designed and would require more than a doubling in number of logic components for its embodiment.

Figure 6:
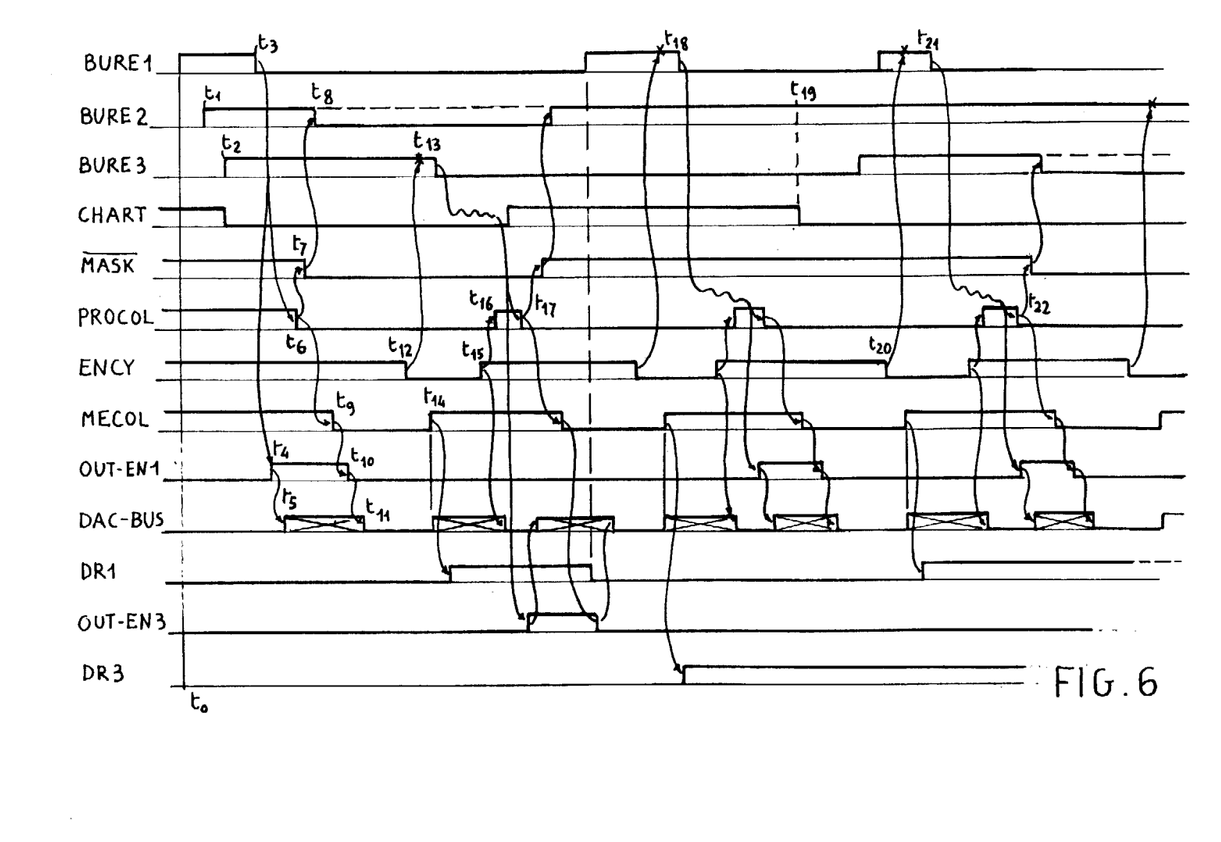
FIG. 6 is a timing diagram showing an example of a dialogue which occurs among the memory unit of FIG. 5 and the several system units or processors.

Having described the circuital aspects of a preferred form of embodiment of the invention and the operation of such circuits, it is useful, for a better understanding of the invention, to reconsider in the whole the working of the priority selection and dialogue unit of the various processors with reference to the timing diagrams of FIG. 6. Diagram BURE 1 shows the logic level present on lead 11 at the output from processor 1. Diagram BURE 2 shows the logic level present on lead 12 at the output from processor 2. Diagram BURE 3 shows the logic level present on lead 13 at the output from processor 3. It is recalled that the dialogue unit circuits of processors 2 and 3 are indentical to the dialogue unit circuits of processor 1 described with reference to FIG. 4. Diagram CHART shows the logic level present on lead 10. Diagram $\overline{\text{MASK}}$ shows the logic level present at the output Q of flip-flop MASK of the several processors, as for instance flip-flop 54 of processor 1. Diagram PROCOL shows the logic level present on lead 8. Diagram ENCY shows the logic level on lead 7. Diagram MECOL shows the logic level present on lead 9. Diagram OUT EN1 shows the logic level present at the output of AND gates 74 or 75 of the dialogue unit of processor 1. Diagram OUT EN3 shows the logic level present at output of the AND circuits such as 74 or 75 but belonging to processor 3. Diagram DAC-BUS shows the DAC-BUS state. Diagram DR 1 shows the logic level present at the output of flip-flop 67 or 69 of FIG. 4 belonging to processor 1. Diagram DR 3 shows the logic level present at the output of processor 3 flip-flops corresponding to processor 1 flip-flops 67 and 69. The chaining arrows from edge to edge of the several diagrams show the chaining of the events.

At an initial time $t_0$ processor 1 produces a low priority access request: register 14 (FIG. 2) is loaded and flip-flops 26 and 28 are set. Because $\overline{\text{MASK}}$ is at logic level 1, BURE 1 rises to logic level 1 and propagates across lead 11. When BURE 1 is received by GAM 5, it activates through logic elements 131, 135, and 136 the loading of register 134, the delay line 139, the set of flip-flop 138 and finally the set of flip-flop 143 which enables the several outputs of logic elements 145, 146, and 147. The output of inverter/driver 145 is grounded and BURE 1 falls to level 0. Level 0 propagates across lead 11 and at time $t_3$ it is received by processor 1, informing such processor that its request is accepted.

In the meanwhile at time $t_1$ also processor 2 has presented a low priority access request bringing to level 1 signal BURE 2. Even processor 3 at time $t_2$ presents an high priority request bringing to level 1 signal BURE 3 and bringing to level 0 signal CHART. In such case, the flip-flop corresponding to flip-flop 25 is set. Such events are completely asynchronous. It will be to be noted that $\overline{\text{MASK}}$ does not fall to 0 at the same time of CHART. Should this occur, BURE 1 would go to level 0 at time $t_2$ and at the same time flip-flop 36 (ASCY) would be locked and made insensible to trailing edge of BURE 1. Such action would interfere with the decision taken before by GAM 5 of acknowledging the request of processor 1 and with the signalling produced by GAM 5 lowering BURE 1. In order to prevent such interferences it is necessary to defer the masking action at a time known by all processors in which it is sure that BUS assignments are not in progress because is such time the BUS has been already assigned. Such time coincides with the falling to 0 of signal PROCOL. It is to be noted that such problem occurs only because in the described preferred embodiment a single lead is used for transferring from processor to GAM an access request and for transferring from GAM to processor an accepted request signal as it has been clearly shown in the above mentioned Italian Patent Application. On the contrary, it is perfectly possible to use two separate leads for the two functions in which case the masking action could be immediate. The circuit changes required for such case are obvious to the expert in the art.

In continuation of the description, the fall of BURE 1 sets flip-flop 36 activating the BUS occupation. In order, first flip-flops 38 and 40 are set, then flip-flop 26 reset and flip-flop 47 set. At time $t_4$, OUT EN1 rises to level 1 allowing the transfer of information from register 14 onto DAC-BUS (time $t_5$). Logic level 1 on the DAC-BUS diagram shows that meaningful binary information is present on DAC-BUS.

When flip-flop 49 is set, PROCOL falls to level 0 (time $t_6$). This causes in all processors the set of the flip-flop corresponding to 54 in processor 1, since CHART is at 0; and consequently it causes also the passage to 0 of $\overline{\text{MASK}}$ and the masking of BURE 2, which indicates a low priority request. On the contrary BURE 3 is kept at level 1 because it refers to a high priority request. When GAM 5 receives signal PROCOL at 0, it resets flip-flop 143, loads registers 102 with information present on DAC-BUS and lowers signal MECOL to 0 (time $t_9$) starting a memory cycle (or more generally operations specified by the received information). When processor 1 receives MECOL at level 0, flip-flop 68 is reset and signal OUT EN1 (time $t_{10}$) falls to 0 removing the information from DAC-BUS. In the other processors MECOL produces no effect.

Near the memory cycle end, GAM 5 lowers signal ENCY to 0 (time $t_{12}$). At the same time GAM 5 reset flip-flop 138 (FIG. 5) and allows the recognition of pending access requests and the loading of register 134. Because the low priority access requests are masked (particularly BURE 2), BURE 3 is recognized (time $t_{13}$) as being at logic level 1 and driver 147 is grounded lowering BURE 3 to level 0. Such operation occurs before the memory cycle is ended, so that the propagation time of signals in the priority network and associated circuits, and then along leads 11, 12, and 13 up to the processors, overlaps the cycle already in progress. As a result, the selected processor will be already prepared to access the BUS without delay from the beginning of the new cycle. Near the memory cycle end, GAM 5 raises signal MECOL to 1 (time $t_{14}$) and at the same time it allows the transfer of the information contained into register 103 (for example data readout from memory) on DAC-BUS. In processor 1, the rising to 1 of MECOL causes the set of flip-flop 69 with consequent loading of the information present on DAC-BUS into register 17. Meanwhile, the new fall of BURE 3 to 0 causes the set of flip-flop ASCY corrisponding to 36 in processor 1; such flip-flop is not locked by $\overline{\text{MASK}}$ being at level 0, because its J input is held at level 1 by a flip-flop corresponding to 25 in set (time $t_{14}$). The set of ASCY does not act immediately on the flip-flop corrisponding to 38 because the cycle in progress is not terminated yet (PROCOL and ENCY are still at level 0).

At the memory cycle end, GAM 5 again raises ENCY to level 1 and it rids DAC-BUS of present information (time $t_{15}$). As soon as processor 1 receives the rising edge of ENCY flip-flops, 38, 49 and 40 are reset; and PROCOL rises again to 1 (time $t_{16}$). The new rising of ENCY does not have any effect on the other processors. As soon as PROCOL rises again to 1, processor 3, which has its flip-flop corresponding to 36 in set, sets the flip-flops corresponding to 38 and 39, then resets the flip-flop corresponding to 25 and sets the flip-flop corresponding to 49. Therefore in order: (a) OUT EN3 rises to 1 and the information to be sent to GAM 5 is loaded on DAC-BUS; (b) signal CHART rises again to 1 (since in the example only processor 3 was imposing the condition CHART to 0 with its flip-flop corresponding to 25 in set); (c) finally PROCOL falls again to 0 (time $t_{17}$).

The fall to 0 of PROCOL resets flip-flop MASK corresponding to 54 in several processors, because the previous return to 1 of CHART applies now to J and K inputs a logic 0 and a logic 1 respectively. $\overline{\text{MASK}}$ goes again to logic level 1; and it causes signal BURE 2 at logic level 1, masked previously, to appear again on lead 12. The fall of PROCOL received by GAM 5 activates the memory cycle. Therefore MECOL is brought to level 0; this causes the reset of the flip-flop corresponding to 66 in processor 3, the fall to 0 of OUT EN3, and the removal from DAC-BUS of the information therein.

Meanwhile, in a totally independent and asynchronous way with respect to the dialogue between processor 3 and GAM 5, the assumption is made that processor 1 presents another access request to the BUS by raising signal BURE 1 to 1 and resetting at the same time its flip-flop 69. Near the memory cycle end, the fall of ENCY and the consequent reset of flip-flop 138 in GAM 5 produces the recognition of pending access requests and the assignment of the following cycle to the request with higher priority, in such case BURE 1. Then the above explained events occur again in memory 4 and in processor 1.

It is assumed now that, meanwhile, in a totally independent and asynchronous manner, processor 2, which had already presented a low priority access request during the course of its working, requires now a high priority access. Therefore processor 2 sets its flip-flop corresponding to 25, thus lowering to 0 signal CHART (time $t_{19}$).

On the other hand, because BURE 2 is already at level 1, no level changes occurs on such lead.

Before the following return of ENCY to 0 (time $t_{20}$) and then before the recognition of pending requests in GAM and the BUS assignment to the requesting processor with higher priority, the assumption is made that both processor 3 and processor 1 present a low priority access request. High and low priority requests presented by all processors are present with the ENCY fall, since MASK is still at logic level 1. Therefore the following cycle is assigned to processor 1 which has greater priority (time $t_{21}$); but with the following fall of PROCOL to 0 (time $t_{22}$) flip-flop MASK of several processors is set, and $\overline{\text{MASK}}$ goes to level 0, so masking the pending request of processor 1. Then the only high priority requests (BURE 2) appear on leads 11, 12, and 13. Therefore the following cycle is assigned to processor 2; and during the dialogue, the several flip-flops and the register involved in BUS access with high priority level are reset. On the other hand, the flip-flops and the registers involved in BUS access with low priority level stay set in processor 2, because the corresponding request has not been accepted yet. Once the cycle assigned to processor 2 for the high priority access request is ended, if in the meanwhile no other high priority access requests or a low priority access request of processor 1 (which has greater priority for assumption) are presented, the low priority request of processor 2 will be finally honored.

Having described a preferred form of embodiment of the invention and its way of operating, it is convenient to stress that many various changes can be made to such form of embodiment without departing from the scope of the invention. For instance, as above said, separate leads for each processor may be used for sending access requests and for receiving the related access grant. Likewise, it is possible to consider systems with more than two priority levels having therefore intermediate masking levels. Likewise, it is possible to consider systems with two or more priority levels which are used in part by part of the system processors. In other words some processors or system units may send access requests with one priority level. Such changes are only exemplary changes.

We claim:

1. In a data processing system including (A) a plurality of units coupled together with one BUS to which each unit may access through an access request and (B) a BUS access control unit coupled to said BUS, apparatus for handling said access requests comprising:
    first means in each of said units for generating and placing on said BUS access requests with at least two separate priority levels, high and low, respectively;
    a priority network in said BUS access control unit for assigning a fixed relative priority to requests received from said first means, independently of their priority level; and
    second means in each of said units for recognizing the presence of high priority level access requests generated by any one of said units and for masking all possible low priority level access requests generated by said first means in the same unit during the time in which at least a high priority level access request is present.

2. In a data processing system including (A) a plurality of units coupled together with one BUS to which each unit may access through an access request and (B) a BUS access control unit coupled to the BUS for assigning the BUS to the requesting units, apparatus for handling said access requests comprising:
    first individual BUS coupling means between each of said units and said control unit;
    second collective BUS coupling means among said units;
    third means in each of said units for applying an access request to said corresponding first means;
    a priority network in said control unit for assigning a fixed relative priority to access requests received through said first means and for accepting the access request with higher priority in case of simultaneous access requests;
    fourth means in each of said units for concurrently applying an access request to the corresponding one of said first means and a signal to said second means, said signal characterizing the access request concurrently presented as a high priority level access request; and fifth means in each of said units and coupled to said second means for inhibiting, in the presence of said signal on said second means the application of access requests to said first means by said third means.

3. In the system as claimed in claim 2, said first means comprising means for the bidirectional transfer of signals over a single connection element between each of said units and said control unit, and said priority network comprising sixth means for the generation of an accepted request signal, said accepted request signal being applied to said single connection element between the unit whose access has been accepted and said control unit.

* * * * *